(12) United States Patent
Katori et al.

(10) Patent No.: US 11,271,245 B2
(45) Date of Patent: Mar. 8, 2022

(54) PRODUCTION METHOD FOR SOLID ELECTROLYTE HAVING LI3PS4

(71) Applicant: MITSUBISHI GAS CHEMICAL COMPANY, INC., Tokyo (JP)

(72) Inventors: Aki Katori, Niigata (JP); Kotaro Kawakami, Niigata (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 401 days.

(21) Appl. No.: 16/493,924

(22) PCT Filed: Mar. 16, 2018

(86) PCT No.: PCT/JP2018/010374
§ 371 (c)(1),
(2) Date: Sep. 13, 2019

(87) PCT Pub. No.: WO2018/173940
PCT Pub. Date: Sep. 27, 2018

(65) Prior Publication Data
US 2020/0358130 A1    Nov. 12, 2020

(30) Foreign Application Priority Data

Mar. 22, 2017    (JP) .............................. JP2017-055755

(51) Int. Cl.
*H01M 10/0525* (2010.01)
*H01M 10/0562* (2010.01)

(52) U.S. Cl.
CPC ... *H01M 10/0562* (2013.01); *H01M 10/0525* (2013.01); *H01M 2300/0065* (2013.01)

(58) Field of Classification Search
CPC ...................... H01M 10/0525; H01M 10/0562
See application file for complete search history.

(56) References Cited

U.S. PATENT DOCUMENTS 10,008,735 B2    6/2018    Ohtomo et al.
2012/0301796 A1    11/2012    Ohtomo et al.
(Continued)

FOREIGN PATENT DOCUMENTS

CN    103 500 853    3/2016
JP    5141675 B2    2/2013
(Continued)

OTHER PUBLICATIONS

Homma et al., "Crystal structure and phrase transitions of the lithium ionic conductor Li3PS4", Solid State Ionics, 182, 2011, pp. 53-58.
(Continued)

*Primary Examiner* — Osei K Amponsah
(74) *Attorney, Agent, or Firm* — Greenblum & Bernstein, P.L.C.

(57) ABSTRACT

The present invention can provide a production method for a solid electrolyte having $Li_3PS_4$, said method characterized by including: a solution-making step in which a homogenous solution is prepared by mixing $Li_2S$ and $P_2S_5$ into an organic solvent; and a precipitation step in which further $Li_2S$ is added to and mixed in the homogenous solution and a precipitate is formed. Preferably, the embodiment either has a molar ratio ($Li_2S/P_2S_5$) between the $Li_2S$ and the $P_2S_5$ in the solution-making step of 1.0-1.85 or has further $Li_2S$ added to the homogenous solution in the precipitation step such that the molar ratio becomes $Li_2S/P_7S_5=2.7\text{-}3.3$.

8 Claims, 4 Drawing Sheets

(56) References Cited

U.S. PATENT DOCUMENTS

2015/0093652 A1 4/2015 Yuich et al.
2018/0269521 A1 9/2018 Ohtomo et al.

FOREIGN PATENT DOCUMENTS

JP 2015-201372 A 11/2015
JP 2016-018679 A 2/2016

OTHER PUBLICATIONS

Liu et al., "Anomalous High Ionic Conductivity of Nanoporous B—Li3PS4", Journal of the American Chemical Society, 135, 2013, pp. 975-978.
Official Communication dated May 22, 2018 in International Application No. PCT/JP2018/010374.
Extended European Search Report for EP 18772416.6 dated Dec. 12, 2019.
Phuc Nguyen Huu Huy et al., *Chemical Synthesis of $Li_3PS_4$ Precursor Suspension by Liquid Phase Shaking*, Solid State Ionics, Dec. 9, 2015.
Wang et al., *Fabrication of Ultrathin Solid Electrolyte Membranes of Beta-$Li_3PS_4$ Nanoflakes by Evaporation-induced Self-assembly for All-Solid-State Batteries*, Journal of Materials Chemistry, Apr. 24, 2016.

PRODUCTION METHOD FOR SOLID ELECTROLYTE HAVING LI3PS4

TECHNICAL FIELD

The present invention relates to a method for producing a solid electrolyte.

BACKGROUND ART

Recently, a demand for lithium ion secondary batteries has been increased in applications including portable information terminals, portable electronic equipments, electric vehicles, hybrid electric vehicles and stationary power storage systems. However, currently, a flammable organic solvent is used as an electrolytic solution in lithium ion secondary batteries, and a strong exterior is required so that an organic solvent does not leak out. Further, for example, in the case of portable personal computers, it is necessary to employ a structure against a risk at the time when an electrolytic solution leaks out. Thus, there is a limitation on structures of devices.

Moreover, the range of applications thereof has been widened to movable bodies such as vehicles and aircrafts, and a high capacity is desired for stationary lithium ion secondary batteries. Under such circumstances, importance tends to be placed on safety more than before, and efforts are concentrated on the development of an all-solid-state lithium ion secondary battery in which none of toxic substances such as organic solvents is used.

For example, use of an oxide, phosphate compound, organic polymer, sulfide or the like as a solid electrolyte in an all-solid-state lithium ion secondary battery has been examined.

Among these solid electrolytes, the sulfide has characteristics that it has high ion conductivity and is relatively soft, and that it is easy to form the interface between solids. The sulfide is stable with respect to active materials and has been developed as a practical solid electrolyte.

However, since a sulfide solid electrolyte generates hydrogen sulfide when reacted with water, it significantly and adversely affects the manufacturing process of batteries. As one of methods for solving this, it is known to use $Li_3PS_4$ having an ortho composition which is obtained at a molar ratio of $Li_2S:P_2S_5=75:25$, wherein the amount of hydrogen sulfide generated is very small (Patent Document 1). In addition, it is known that $Li_3PS_4$ has a plurality of crystal conditions (Non-Patent Document 2). However, the technique of Patent Document 1 has a complicated process in which the vitrification treatment has two stages.

Meanwhile, Non-Patent Document 1 reports a very convenient synthesis method, wherein suspension and mixing are carried out in tetrahydrofuran (hereinafter abbreviated as "THF") at a molar ratio of $Li_2S:P_2S_5=75:25$ to precipitate $Li_3PS_4 \cdot 3THF$ crystal, which is dried at 150° C., thereby obtaining $\beta$-$Li_3PS_4$. However, this method has a problem that by-products are generated at the time of suspending and mixing in THF to yellow a reaction solution. It was found that when such a solid electrolyte having $Li_3PS_4$ containing by-products is activated as an all-solid-state battery, charging and discharging are not performed normally.

PRIOR ART DOCUMENTS

Patent Documents

Patent Document 1: Japanese Patent No. 5141675

Non-Patent Documents

Non-Patent Document 1: J. Am. Chem. Soc. 2013, 135, 975-978
Non-Patent Document 2: Solid State Ionics. 2011, 182, 53-58

SUMMARY OF THE INVENTION

Problems to be Solved by the Invention

Under the above-described circumstances, it has been desired to provide a method for producing a solid electrolyte having $Li_3PS_4$ which has excellent productivity and contains by-products in an amount as small as possible.

Means for Solving the Problems

The present inventors diligently made researches in consideration of the above-described problem and found that the problem can be solved by the present invention described below.

Specifically, the present invention is as described below.
<1> A method for producing a solid electrolyte having $Li_3PS_4$, which comprises:
a solution-making step in which a homogenous solution is prepared by mixing $Li_2S$ and $P_2S_5$ into an organic solvent; and
a precipitation step in which $Li_2S$ is further added to and mixed in the homogenous solution to form a precipitate.
<2> The method according to item <1>, wherein the molar ratio between $Li_2S$ and $P_2S_5$ ($Li_2S/P_2S_5$) in the solution-making step is 1.0 to 1.85.
<3> The method according to item <1> or <2>, wherein $Li_2S$ is further added to the homogenous solution in the precipitation step so that the molar ratio of $Li_2S/P_2S_5$ becomes 2.7 to 3.3.
<4> The method according to any one of items <1> to <3>, which comprises a drying step after the precipitation step, wherein the drying temperature in the drying step is 120° C. or higher, and wherein said $Li_3PS_4$ is $\beta$-$Li_3PS_4$.
<5> The method according to any one of items <1> to <4>, wherein $Li_2S$ and $P_2S_5$ are dissolved in the organic solvent in this order in the solution-making step so that the total concentration of $Li_2S$ and $P_2S_5$ becomes 1 to 40% by weight.
<6> The method according to any one of items <1> to <5>, wherein the organic solvent is an ether-based solvent.
<7> The method according to item <6>, wherein the ether-based solvent is tetrahydrofuran.
<8> The method according to any one of items <1> to <7>, wherein the solution-making step and the precipitation step are carried out under inert gas atmosphere.

Advantageous Effect of the Invention

According to the present invention, it is possible to produce a solid electrolyte having $Li_3PS_4$ in which the content of by-products is very small. Moreover, the production method of the present invention can be applied to mass production.

EMBODIMENTS FOR CARRYING OUT THE INVENTION

Hereinafter, the method for producing a solid electrolyte having $Li_3PS_4$ of the present invention, a solid electrolyte obtained by the production method, a formed body obtained by heating and forming the solid electrolyte, an all-solid-state battery including the solid electrolyte, etc. will be specifically described. Note that materials, constitutions, etc. described below do not limit the present invention and can be modified variously within the range of the gist of the present invention.

<Method for Producing Solid Electrolyte Having $Li_3PS_4$>

The production method of the present invention is a method for producing a solid electrolyte having $Li_3PS_4$, which comprises: a solution-making step in which a homogenous solution is prepared by mixing $Li_2S$ and $P_2S_5$ into an organic solvent; and a precipitation step in which $Li_2S$ is further added to and mixed in the homogenous solution to form a precipitate.

Further, the solid electrolyte having $Li_3PS_4$ obtained by the production method of the present invention has the below-described characteristics.

$Li_3PS_4$ is a substance in which an ortho composition is formed. In this regard, "ortho" generally refers to an oxoacid which has the highest hydration degree among oxoacids obtained by hydration of the same oxide. Regarding sulfide solid electrolyte materials obtained by using $Li_2S$, a crystal composition in which $Li_2S$ is added in the largest amount among sulfides is referred to as the ortho composition. Among $Li_2S$—$P_2S_5$-based materials, $Li_3PS_4$ corresponds to the ortho composition, and it is obtained when mixing raw materials at a molar ratio of $Li_2S:P_2S_5$=75:25 on a molar basis.

$Li_3PS_4$ exists in the form of an amorphous body or a crystal body. As crystals, α-form, β-form and γ-form crystals are known (Non-Patent Document 2), and in the production method of the present invention, in particular, the β-form crystal can be easily obtained. X-ray diffraction of the β-form crystal (CuKα: $\lambda$=1.5405 Å) is characterized in that it has peaks at at least 2θ=13.5±0.5 deg, 17.5±0.5 deg, 18.1±0.5 deg, 19.8±0.5 deg, 26.0±0.5 deg, 27.4±0.5 deg, 29.0±0.5 deg, 29.8±0.5 deg, 31.1±0.5 deg, 39.3±0.5 deg, 40.4±0.5 deg, 44.9±0.5 deg and 47.6±0.5 deg. Further, $Li_3PS_4$ obtained by the present invention has a peak at 420 $cm^{-1}$ in a Raman measurement. Note that $P_2S_5$ has a peak at 540 $cm^{-1}$ and $Li_3PS_4$ obtained by the present invention does not include this peak.

<Solution-Making Step>

In the production method of the present invention, the molar ratio between $Li_2S$ and $P_2S_5$ is not particularly limited as long as it is within a range in which the effects of the present invention are obtained, but it is preferred to produce a homogeneous solution by mixing $Li_2S$ and $P_2S_5$ into an organic solvent at a molar ratio of $Li_2S/P_2S_5$=1.0 to 1.85. In this regard, the above-described molar ratio is more preferably $Li_2S/P_2S_5$=1.2 to 1.8, even more preferably $Li_2S/P_2S_5$=1.3 to 1.7, still more preferably $Li_2S/P_2S_5$=1.4 to 1.6, and most preferably $Li_2S/P_2S_5$=1.5 ($Li_2S:P_2S_5$=60:40).

When the molar ratio of $Li_2S/P_2S_5$ is 1.0 to 1.85, a solution can be suitably made by using $Li_2S$ and $P_2S_5$ at room temperature. When the molar ratio is not within the above-described range, precipitation may be caused. Note that when an undissolved precipitate is separated from a solution by means of filtration or the like, the composition in the solution becomes the same as that obtained in the solution-making step carried out with a molar ratio within the above-described range.

$Li_2S$ to be used may be either a synthesized product or a commercially-available product. The lower the content of moisture is, the better it is because mixing of moisture deteriorates the other raw materials and the precursor. The content is more preferably 300 ppm or less, and particularly preferably 50 ppm or less. The smaller the particle diameter of $Li_2S$ is, the better it is because the reaction rate becomes higher. The particle diameter is preferably 10 nm to 100 μm, more preferably 10 nm to 30 μm, and even more preferably 100 nm to 10 μm. Note that the particle diameter can be measured by means of SEM, a particle size distribution measurement apparatus utilizing laser scattering, or the like.

$P_2S_5$ to be used may be either a synthesized product or a commercially-available product. The higher the purity of $P_2S_5$ is, the better it is because the amount of impurities mixed in the solid electrolyte becomes smaller. The smaller the particle diameter of $P_2S_5$ is, the better it is because the reaction rate becomes higher. The particle diameter is preferably 10 nm to 100 μm, more preferably 10 nm to 30 μm, and even more preferably 100 nm to 10 μm.

The organic solvent is not particularly limited as long as it does not react with $Li_2S$ or $P_2S_5$. Examples thereof include an ether-based solvent, an ester-based solvent, a hydrocarbon-based solvent and a nitrile-based solvent. Specific examples thereof include THF (tetrahydrofuran), cyclopentyl methyl ether, diisopropyl ether, diethyl ether, dimethyl ether, dioxane, methyl acetate, ethyl acetate, butyl acetate and acetonitrile. Particularly preferred is THF. For preventing deterioration of the raw material composition, it is preferred to remove oxygen and water in the organic solvent in advance. In particular, regarding the water content, it is preferably 100 ppm or less, and more preferably 50 ppm or less.

The total concentration of $Li_2S$ and $P_2S_5$ in the organic solvent is preferably 1 to 40% by weight, more preferably 5 to 30% by weight, and particularly preferably 10 to 20% by weight. When the total concentration of $Li_2S$ and $P_2S_5$ in the organic solvent is higher than 40% by weight, the viscosity of a slurry is increased and it may become difficult to perform mixing. Meanwhile, when the total concentration of $Li_2S$ and $P_2S_5$ in the organic solvent is lower than 1% by weight, a large amount of the organic solvent must be used and a load of solvent recovery is increased. In addition, the size of a reactor may be excessively increased relative to a large substrate.

In the solution-making step in the present invention, $Li_2S$ gradually reacts with $P_2S_5$ suspended in the organic solvent, resulting in a state in which a solution can be made. Accordingly, when the reaction rate is high, it is preferred that firstly $P_2S_5$ is added to and suspended in the organic solvent, followed by adding Li$_2$S thereto. This is because, when the reaction rate is high and P$_2$S$_5$ is added in a state where Li$_2$S is in an excess amount, Li$_3$PS$_4$ is produced and may be partially precipitated.

Mixing in the solution-making step is preferably performed under inert gas atmosphere. Examples of the inert gas include nitrogen, helium and argon, and particularly preferred is argon. By also removing oxygen and moisture in the inert gas, deterioration of the raw material composition can be suppressed. The concentration of each of oxygen and moisture in the inert gas is preferably 1000 ppm or less, more preferably 100 ppm or less, and particularly preferably 10 ppm or less.

At the time of mixing in the solution-making step, a substrate is dispersed to provide a slurry state, but it is reacted to become homogeneous finally. There is no need to carry out special stirring operation for crushing particles, and it is sufficient when stirring power that can enable suspension and dispersion of the slurry is provided.

Regarding the reaction temperature in the solution-making step, the reaction slowly proceeds even at room temperature, but heating can be performed for increasing the reaction rate. When heating is performed, it is sufficient when it is performed at a temperature that is the boiling point of the organic solvent or lower. The temperature varies depending on the organic solvent to be used, but is usually lower than 120° C. Heating can also be performed under the pressurized state using an autoclave or the like. However, when mixing is carried out at a high temperature (120° C. or higher), there is concern that a side reaction may proceed.

The reaction time in the solution-making step varies depending on the type of the organic solvent and the particle diameter and concentration of raw materials, but for example, by performing the reaction for 0.1 to 24 hours, the reaction is completed and a solution can be made.

In the homogeneous solution made, a slight amount of a precipitate may be generated depending on the ratio of the composition added and the condition of mixing of raw material impurities. In this case, it is desirable to remove the precipitate by means of filtration or centrifugation.

<Precipitation Step>

Li$_2$S is further added to and mixed with the homogeneous solution obtained in the solution-making step, thereby obtaining a precipitate.

In the precipitation step in the present invention, it is preferred that Li$_2$S is further added to the homogeneous solution so that the molar ratio of Li$_2$S/P$_2$S$_5$ becomes 2.7 to 3.3. The above-described molar ratio is more preferably Li$_2$S/P$_2$S$_5$=2.8 to 3.2, even more preferably Li$_2$S/P$_2$S$_5$=2.9 to 3.1, and most preferably Li$_2$S/P$_2$S$_5$=3.0 (Li$_2$S:P$_2$S$_5$=75: 25). Li$_2$S is added to and mixed with the homogeneous solution so that the molar ratio of all the raw materials added to the system becomes Li$_2$S:P$_2$S$_5$=75:25, thereby obtaining a high-purity solid electrolyte having Li$_3$PS$_4$ in which the generation of by-products is significantly suppressed.

The precipitate may be a solvate. For example, when THF is used as the organic solvent, Li$_3$PS$_4$·3THF crystal is obtained. Li$_2$S to be added may be the same as that used in the solution-making step. The adding amount is adjusted such that the molar ratio of all the raw materials added to the system becomes Li$_2$S/P$_2$S$_5$=2.7 to 3.3 as described above. When the amount of P$_2$S$_5$ is too much, an excess of P$_2$S$_5$ is precipitated and mixed into the solid electrolyte having Li$_3$PS$_4$. In this case, hydrogen sulfide tends to be generated in a subsequent step or a process for preparing an all-solid-state battery, and in addition, it may adversely affect charge and discharge of the all-solid-state battery.

The precipitate is generated when the reaction proceeds to produce Li$_3$PS$_4$. The reaction mechanism is not known, but it is considered that the material is dissolved in the solution in the state of —(P—S—P—S)n-. It is considered that Li$_2$S added thereto is dispersed on the slurry and cleaves P—S, thereby producing Li$_3$PS$_4$.

Regarding the temperature in the precipitation step, the reaction slowly proceeds even at room temperature, but heating can be performed for increasing the reaction rate. When heating is performed, it is sufficient when it is performed at a temperature that is the boiling point of the organic solvent or lower. The temperature varies depending on the organic solvent to be used, but is usually lower than 120° C. Heating can also be performed under the pressurized state using an autoclave or the like. However, when the operation is carried out at a high temperature (120° C. or higher), there is concern that a side reaction may proceed.

The reaction time in the precipitation step varies depending on the type of the organic solvent and the particle diameter and concentration of raw materials, but for example, by performing the reaction for 0.1 to 24 hours, the reaction is completed and a precipitate can be made.

Mixing in the precipitation step is preferably performed under inert gas atmosphere. Examples of the inert gas include nitrogen, helium and argon, and particularly preferred is argon. By also removing oxygen and moisture in the inert gas, deterioration of the raw material composition can be suppressed. The concentration of each of oxygen and moisture in the inert gas is preferably 1000 ppm or less, more preferably 100 ppm or less, and particularly preferably 10 ppm or less.

The obtained precipitate can be separated from the solution by means of filtration or centrifugation. In the production method of the present invention, the amount of by-products generated is very small, but purification can be carried out by separating the precipitate from the solution. By washing the separated precipitate with a solvent, the purification degree can be further increased. Since the amount of by-products produced is very small, it is not required to use a large amount of a washing solvent. For example, it is sufficient to use 50 parts by weight to 600 parts by weight of the solvent relative to 100 parts by weight of the precipitate. As the washing solvent, the same organic solvent as that used in the solution-making step is preferably used, but the washing solvent is not particularly limited as long as it is an organic solvent which does not react with Li$_3$PS$_4$, <Drying Step>

The obtained precipitate is subjected to heated-air drying or vacuum drying, thereby obtaining the solid electrolyte having Li$_3$PS$_4$. The optimum temperature for it varies depending on the type of the solvent. The time for removing the solvent can be shortened by applying a temperature sufficiently higher than the boiling point. The temperature for removing the solvent is preferably 60 to 280° C., and more preferably 100 to 250° C. By removing the solvent under reduced pressure as in the case of vacuum drying or the like, the temperature at the time of removing the solvent can be lowered and the required time can be shortened. In addition, the time required for removing the solvent can also be shortened by flowing an inert gas such as nitrogen and argon in which the moisture content is sufficiently low.

When the drying temperature is set at 120° C. or higher, crystallization is progressed. Usually, β-Li$_3$PS$_4$ is produced. Note that when using THF in the solution-making step and drying Li$_3$PS$_4$·3THF crystal obtained in the precipitation step, an amorphous body is obtained in the case of drying at 100° C. or lower, and β-Li$_3$PS$_4$ is obtained in the case of drying at 120° C. or higher. Thus, by controlling the drying temperature according to need, a crystal condition obtained can be controlled.

The drying time slightly varies depending on the heating temperature, but usually, drying for 1 to 24 hours is sufficient. It is not preferred that heating is carried out at a high temperature for a long period of time which exceeds the above-described range because there is concern for change in quality of the solid electrolyte.

The solid electrolyte having Li$_3$PS$_4$ of the present invention obtained in the above-described manner can be formed into a desired forming body by various means and can be used for various applications including an ail-solid-state battery described below. The forming method is not particularly limited. For example, a method similar to the method for forming respective layers constituting the all-solid-state battery described below with respect to the all-solid-state battery can be used.

<All-Solid-State Battery>

The solid electrolyte having Li$_3$PS$_4$ of the present invention can be used, for example, as a solid electrolyte for all-solid-state batteries. Further, according to another embodiment of the present invention, an all-solid-state battery comprising the above-described solid electrolyte for all-solid-state batteries is provided.

Figure 1:
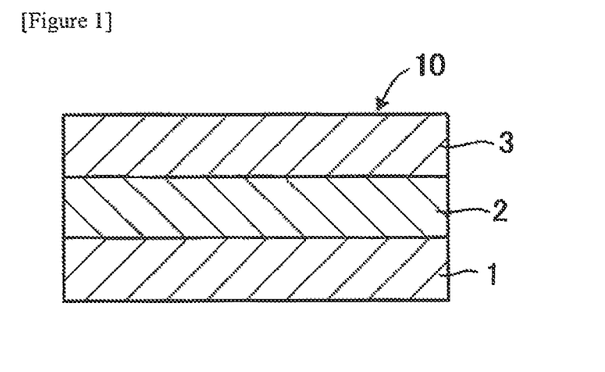
FIG. 1 is a schematic cross sectional view of an all-solid-state battery according to one embodiment of the present invention.

In this regard, the "all-solid-state battery" is an all-solid-state lithium ion secondary battery. FIG. 1 is a schematic cross sectional view of an all-solid-state battery according to one embodiment of the present invention. An all-solid-state battery 10 has a structure in which a solid electrolyte layer 2 is arranged between a positive electrode layer 1 and a negative electrode layer 3. The all-solid-state battery 10 can be used in various devices including mobile phones, personal computers and automobiles.

The solid electrolyte having Li$_3$PS$_4$ of the present invention may be contained as a solid electrolyte in at least one of the positive electrode layer 1, the negative electrode layer 3 and the solid electrolyte layer 2. In the case where the solid electrolyte having Li$_3$PS$_4$ of the present invention is contained in the positive electrode layer 1 or negative electrode layer 3, the solid electrolyte having Li$_3$PS$_4$ of the present invention is used in combination with a publicly-known positive electrode active material or negative electrode active material for lithium ion secondary batteries. The quantitative ratio of the solid electrolyte having Li$_3$PS$_4$ of the present invention to be contained in the positive electrode layer 1 or negative electrode layer 3 is not particularly limited.

In the case where the solid electrolyte having Li$_3$PS$_4$ of the present invention is contained in the solid electrolyte layer 2, the solid electrolyte layer 2 may be composed of the solid electrolyte having Li$_3$PS$_4$ of the present invention alone, and according to need, an oxide solid electrolyte (e.g., Li$_7$La$_3$Zr$_2$O$_{12}$), a sulfide-based solid electrolyte (e.g., Li$_2$S—P$_2$S$_5$), other complex hydride solid electrolytes (e.g., LiBH$_4$ and 3LiBH$_4$—LiI), etc. may be suitably used in combination.

The all-solid-state battery is prepared by forming and laminating the above-described layers, and the forming method and laminating method for the respective layers are not particularly limited.

Examples thereof include: a method in which a solid electrolyte and/or an electrode active material are dispersed in a solvent to provide a slurry-like mixture, which is applied by a doctor blade, spin coating or the like and subjected to rolling to form a film; a gas phase method in which film forming and lamination are performed by using a vacuum deposition method, ion plating method, sputtering method, laser ablation method or the like; and a pressing method in which powder is formed by hot pressing or cold pressing (not heating) and laminated.

Since the solid electrolyte having Li$_3$PS$_4$ of the present invention is relatively soft, it is particularly preferred to prepare the all-solid-state battery by forming the respective layers by means of the pressing method and laminating the layers. As the pressing method, there are hot pressing in which heating is performed and cold pressing in which heating is not performed, but forming the layers can be sufficiently carried out even by means of cold pressing.

Note that the present invention includes a formed body obtained by heating and forming the solid electrolyte having Li$_3$PS$_4$ of the present invention. The formed body is suitably used as a solid electrolyte layer for all-solid-state batteries. Further, the present invention includes a method for producing a solid electrolyte layer for all-solid-state batteries, which includes a step of heating and forming the solid electrolyte having Li$_3$PS$_4$ of the present invention.

EXAMPLES

Hereinafter, the embodiments of the present invention will be more specifically described by way of examples, but the embodiments are not limited to the examples.

Example 1

In a glovebox under argon atmosphere, Li$_2$S (manufactured by Sigma-Aldrich, purity: 99.8%) and P$_2$S$_5$ (manufactured by Sigma-Aldrich, purity: 99%) were weighed so that the molar ratio of Li$_2$S:P$_2$S$_5$ became 1.5:1. Next, to tetrahydrofuran (manufactured by Wako Pure Chemical Industries, Ltd., super dehydrated grade), Li$_2$S and P$_2$S$_5$ were added in this order so that the concentration of (Li$_2$S+P$_2$S$_5$) became 10 wt %, and mixing was carried out at room temperature for 12 hours. The mixture was gradually dissolved, and an almost homogeneous solution containing a slight amount of an insoluble matter was obtained.

To the obtained mixture, Li$_2$S was further added so that the composition of all the raw materials including the above-described ones became such that the molar ratio of Li$_2$S:P$_2$S$_5$=3:1, and mixing was carried out at room temperature for 12 hours to obtain a precipitate. This was vacuum dried at 150° C. for 4 hours, thereby obtaining β-Li$_3$PS$_4$. The series of operations was carried out in the glovebox under argon atmosphere.

Comparative Example 1 in a glovebox under argon atmosphere, Li$_2$S (manufactured by Sigma-Aldrich, purity: 99.8%) and P$_2$S$_5$ (manufactured by Sigma-Aldrich, purity: 99%) were weighed so that the molar ratio of Li$_2$S:P$_2$S$_5$ became 3:1, and the materials were mixed using an agate mortar.

Next, the obtained mixture was put into a 45-mL zirconia pot, zirconia balls ("YTZ" manufactured by Nikkato Corporation, φ: 5 mm, number: 160) were further put therein, and the pot was completely sealed. The pot was attached to a planetary ball mill ("P-7" manufactured by Fritsch) and mechanical milling was carried Out at a rotation speed of 510 rpm for 10 hours to obtain an amorphous body.

Next, the obtained amorphous body was heat treated under argon atmosphere at 300° C. for 8 hours, thereby obtaining β-Li$_3$PS$_4$.

Comparative Example 2

In a glovebox under argon atmosphere, $Li_2S$ (manufactured by Sigma-Aldrich, purity: 99.8%) and $P_2S_5$ (manufactured by Sigma-Aldrich, purity: 99%) were weighed so that the molar ratio of $Li_2S:P_2S_5$ became 3:1. Next, to tetrahydrofuran (manufactured by Wako Pure Chemical industries, Ltd., super dehydrated grade), $Li_2S$ and $P_2S_5$ were added in this order so that the concentration of $(Li_2S+P_2S_5)$ became 10 wt %, and mixing was carried out at room temperature for 12 hours. During mixing, the mixture did not become a homogeneous solution and was maintained in a slurry state. This slurry was vacuum dried at 150° C. for 4 hours, thereby obtaining $\beta\text{-}Li_3PS_4$. The series of operations was carried out in the glovebox under argon atmosphere.

<X-Ray Diffraction Measurement>

Powders of the ion conductors obtained in Example 1 and Comparative Examples 1-2 were subjected to the X-ray diffraction measurement under Ar atmosphere at room temperature (25° C.) ("X' Pert3 Powder" manufactured by PANalytical, CuKα: λ=1.5405 Å).

Figure 2:
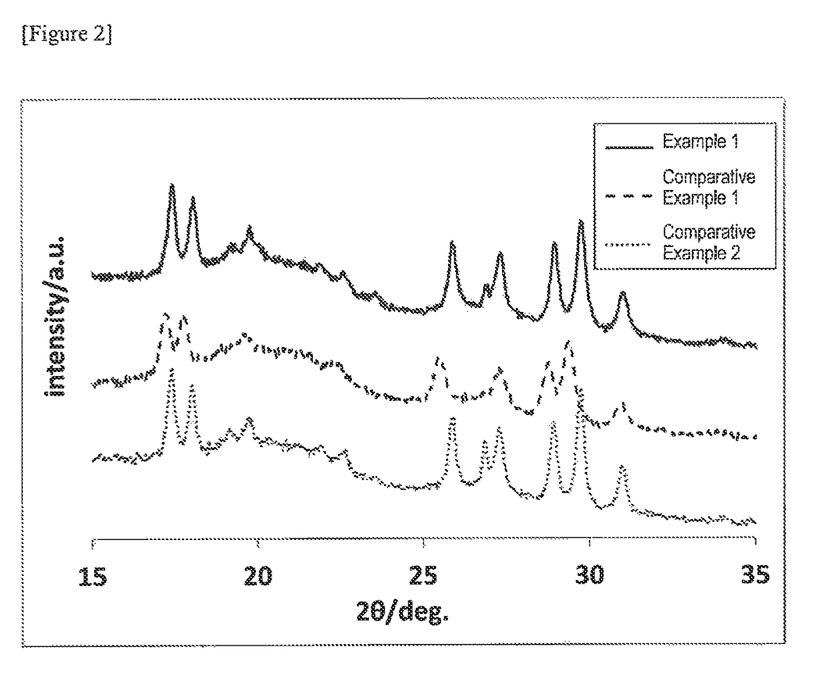
FIG. 2 is a graph showing the results of the X-ray diffraction measurement of Example 1 and Comparative Examples 1 and 2.

The results of the X-ray diffraction measurement of Example 1 and Comparative Examples 1-2 are shown in FIG. 2.

As shown in FIG. 2, in Example 1, the diffraction peaks were observed at at least 13 points, i.e., 2θ=13.5±0.5 deg, 17.5±0.5 deg, 18.1±0.5 deg, 19.8±0.5 deg, 26.0±0.5 deg, 27.4±0.5 deg, 29.0±0.5 deg, 29.8±0.5 deg, 31.1±0.5 deg, 39.3±0.5 deg, 40.4±0.5 deg, 44.9±0.5 deg and 47.6±0.5 deg, and the pattern corresponded to that of $\beta\text{-}Li_3PS_4$ of ICSD database.

<Raman Spectroscopy>

(1) Preparation of Sample

A sample to be measured was prepared by using an airtight container having quartz glass (Φ: 60 mm, thickness: 1 mm) at the upper portion as an optical window. In a glovebox under argon atmosphere, the sample was adhered to the quartz glass, then the container was sealed and taken out from the glovebox, and Raman spectroscopy was carried out.

(2) Measurement Conditions

Using Laser Raman Spectrometer NRS-5100 (manufactured by JASCO Corporation), the measurement was carried out at an excitation wavelength of 532.15 nm for an exposure time of 5 seconds.

Figure 3:
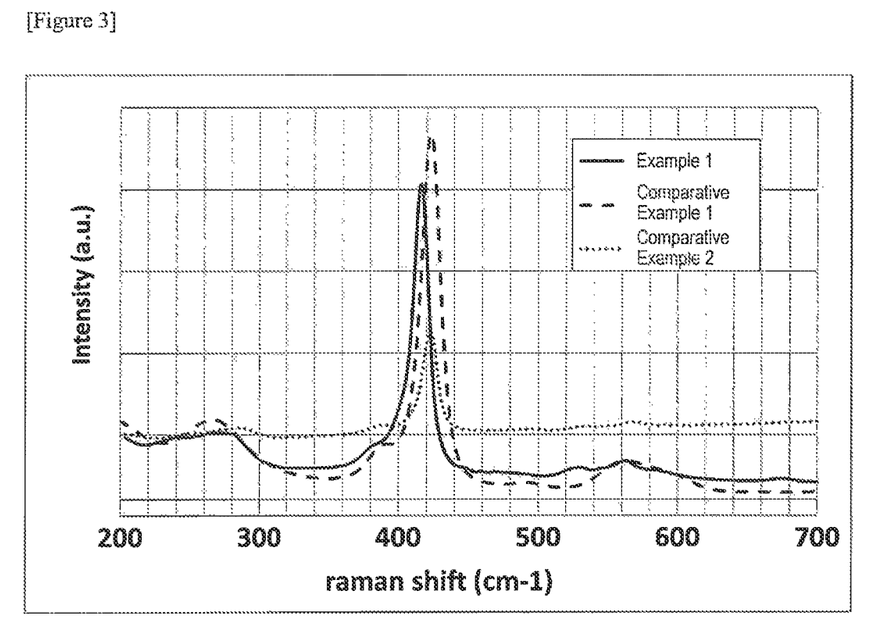
FIG. 3 is a graph showing the results of Raman spectroscopy of Example 1 and Comparative Examples 1 and 2.

The results of Raman spectroscopy of Example 1 and Comparative Examples 1-2 are shown in FIG. 3. With respect to each sample, a peak at 420 $cm^{-1}$ corresponding to $PS_4^{3-}$ was confirmed.

<Lithium Ion Conductivity Measurement>

Each of the ion conductors obtained in Example 1 and Comparative Examples 1-2 was subjected to uniaxial molding (292 MPa) to obtain a disk having a thickness of about 0.8 mm and a diameter of 10 mm. The AC impedance was measured by the four-terminal method utilizing an In (indium) electrode at −20° C. to 100° C. ("SI1260 IMPEDANCE/GAIN-PHASE ANALYZER" manufactured by Solartron), and the lithium ion conductivity was calculated.

Specifically, the sample was put into a thermostatic bath with its temperature being set at 25° C. and it was kept for 30 minutes, and after that, the lithium ion conductivity was measured. Subsequently, the temperature of the thermostatic bath was increased at 10° C. intervals from 30° C. to 100° C., and at each temperature, it was kept for 25 minutes and then the ion conductivity was measured. After the measurement at 100° C. was finished, the temperature of the thermostatic bath was decreased at 10° C. intervals from 90° C. to 30° C. and at 5° C. intervals from 30° C. to −20° C., and then the temperature of the thermostatic bath was increased at 5° C. intervals from −20° C. to 25° C., and at each temperature, it was kept for 25 minutes and then the lithium ion conductivity was measured. The measurement frequency range was 0.1 Hz to 1 MHz, and the amplitude was 50 mV.

Figure 4:
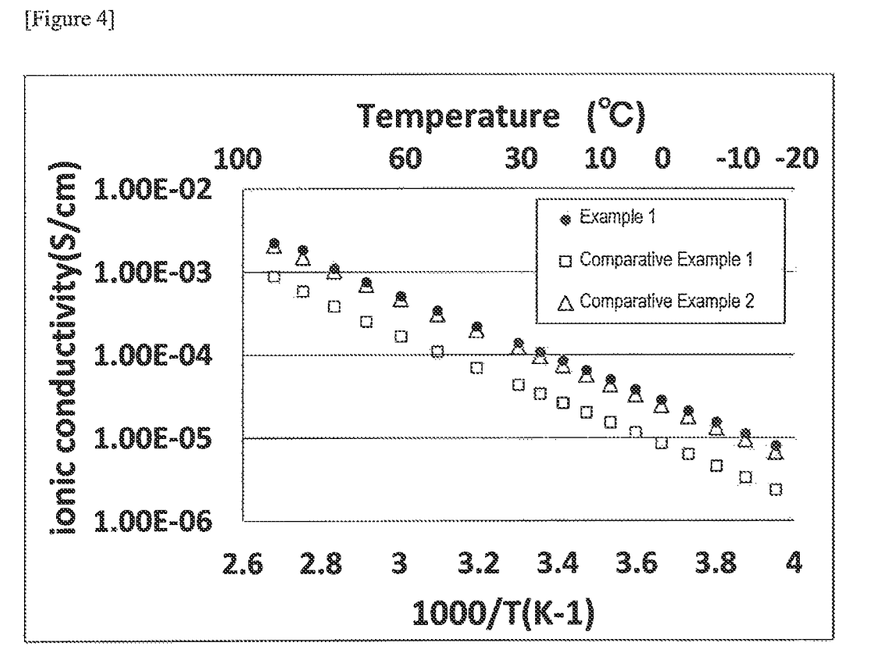
FIG. 4 is a graph showing the results of the ion conductivity measurement of Example 1 and Comparative Examples 1 and 2.

The measurement results of the lithium ion conductivity of Example 1 and Comparative Examples 1-2 are shown in FIG. 4. Nearly equal ion conductivities were obtained in all the samples.

<Charge and Discharge Test>

(Preparation of Positive Electrode Layer Powder)

Lithium titanate $(Li_4Ti_5O_{12})$ was used as a positive electrode active material. Powder in which the weight ratio of the positive electrode active material: sulfide solid electrolyte $(\beta\text{-}Li_3PS_4)$:acetylene black (conduction assisting agent)=40:60:6 was weighed in a glovebox, and mixing was carried out using a mortar to obtain positive electrode layer powder.

(Preparation of all-Solid-State Battery)

Each powder of the sulfide solid electrolytes prepared in Example 1 and Comparative Example 2 was put into a powder tablet forming machine having a diameter of 10 mm and pressed into a disk-like shape under a pressure of 46 MPa (hereinafter also referred to as the sulfide solid electrolyte layer). Without taking out the formed product, the positive electrode layer powder prepared as described above was put into the upper portion of the sulfide solid electrolyte layer, an In foil which was punched into a size of 8φ was attached to the lower portion thereof, and it was integrally formed under a pressure of 292 MPa. In this way, a disk-like pellet in which the positive electrode layer (75 μm), the sulfide solid electrolyte layer (800 μm) and the In foil (100 μm) were sequentially layered was obtained. To the In foil side of the pellet, an In foil of 10 φ and an Li foil of 8 φ were further attached sequentially, and it was put into a battery test cell made of SUS304 to provide an all-solid-state secondary battery.

(Measurement of Lithium Ion Conductivity of Battery Cell)

Regarding the all-solid-state secondary battery prepared as described above, using a potentiostat/galvanostat (VMP3 manufactured by Bio-Logic), the lithium ion conductivity at a measurement temperature of 60° C. was calculated. Specifically, the sample was put into a mantle heater whose temperature was set at 60° C. and kept for 60 minutes and then the lithium ion conductivity thereof was measured. The measurement frequency range was 0.1 Hz to 1 MHz, and the amplitude was 50 mV.

(Charge and Discharge Test)

Regarding the all-solid-state secondary battery prepared as described above, using a potentiostat/galvanostat (VMP3 manufactured by Bio-Logic), charging, and discharging were performed with a constant current under the conditions of the measurement temperature: 60° C., the cut-off voltage: 0.5 to 1.5 V, and the current density: 0.046 $mA/cm^2$ (35.98 μA). Note that a 3-minute pause was provided after charging and discharging respectively.

Figure 5:
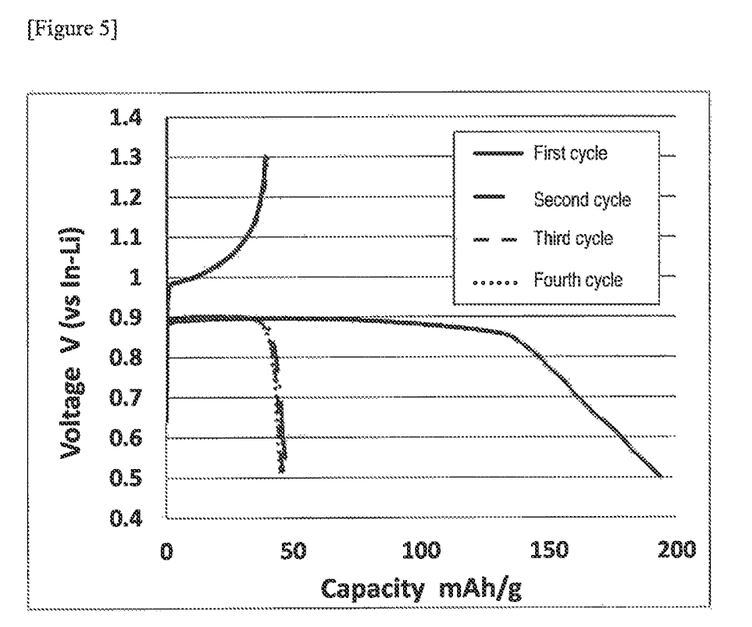
FIG. 5 is a graph showing the results of the charge and discharge test of Example 1.

The results regarding the ion conductivity of the battery cell at 60° C. are shown in Table 1, and the results of the charge and discharge test are shown in FIG. 5. It was understood from Table 1 that Comparative Example 2 has a larger cell resistance and a smaller ion conductivity when compared to Example 1. Accordingly, though the charge and discharge test was tried, it was impossible to perform cycling in Comparative Example 2, and charging and discharging were successfully performed only in Example 1.

TABLE 1

| Sample | Ion conductivity of cell (S/cm) |
| --- | --- |
| Example 1 | $1.84 \times 10^{-5}$ |
| Comparative Example 2 | $5.53 \times 10^{-6}$ |

EXPLANATIONS OF LETTERS OR NUMERALS

1 positive electrode layer
2 solid electrolyte layer
3 negative electrode layer
10 all-solid-state battery

The invention claimed is:

1. A method for producing a solid electrolyte having $Li_3PS_4$, which comprises:
   a solution-making step in which a homogenous solution is prepared by mixing $Li_2S$ and $P_2S_5$ into an organic solvent; and
   a precipitation step in which $Li_2S$ is further added to and mixed in the homogenous solution to form a precipitate.

2. The method according to claim 1, wherein a molar ratio between $Li_2S$ and $P_2S_5$ ($Li_2S/P_2S_5$) in the solution-making step is 1.0 to 1.85.

3. The method according to claim 1, wherein $Li_2S$ is further added to the homogenous solution in the precipitation step so that the molar ratio of $Li_2S/P_2S_5$ becomes 2.7 to 3.3.

4. The method according to claim 1, which comprises a drying step after the precipitation step, wherein a drying temperature in the drying step is 120° C. or higher, and wherein said $Li_3PS_4$ is $\beta$-$Li_3PS_4$.

5. The method according to claim 1, wherein $Li_2S$ and $P_2S_5$ are dissolved in the organic solvent in this order in the solution-making step so that a total concentration of $Li_2S$ and $P_2S_5$ becomes 1 to 40% by weight.

6. The method according to claim 1, wherein the organic solvent is an ether-based solvent.

7. The method according to claim 6, wherein the ether-based solvent is tetrahydrofuran.

8. The method according to claim 1, wherein the solution-making step and the precipitation step are carried out under inert gas atmosphere.

* * * * *